US012332057B2

(12) United States Patent
Tritschler et al.

(10) Patent No.: US 12,332,057 B2
(45) Date of Patent: Jun. 17, 2025

(54) CHIP-INTEGRATED OPTICAL ROTATION RATE SENSOR

(71) Applicant: Robert Bosch GmbH, Stuttgart (DE)

(72) Inventors: Patrick Tritschler, Engen (DE); Torsten Ohms, Vaihingen/Enz-Aurich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 199 days.

(21) Appl. No.: 18/338,173

(22) Filed: Jun. 20, 2023

(65) Prior Publication Data

US 2023/0417551 A1    Dec. 28, 2023

(30) Foreign Application Priority Data

Jun. 27, 2022   (DE) .................... 10 2022 206 454.2

(51) Int. Cl.
*G01C 19/66*         (2006.01)
(52) U.S. Cl.
CPC .................................. *G01C 19/661* (2013.01)
(58) Field of Classification Search
CPC ............... G01C 19/661; G01C 19/721; G02B 6/12007; G01P 3/363
See application file for complete search history.

(56) References Cited

U.S. PATENT DOCUMENTS

| 5,398,111 | A  | * | 3/1995  | Cardarelli | G01C 19/727 372/6 |
| 8,031,343 | B2 | * | 10/2011 | Carothers  | G01C 19/72 356/461 |
| 2003/0053067 | A1 | | 3/2003 | Hashimoto | |
| 2004/0061863 | A1 | * | 4/2004 | Digonnet | G01D 5/3538 356/483 |
| 2010/0328673 | A1 | * | 12/2010 | Carothers | G01C 19/72 356/460 |
| 2021/0140768 | A1 | | 5/2021 | Paniccia | |

(Continued)

OTHER PUBLICATIONS

Ciminelli et al., "Photonic Technologies for Angular Velocity Sensing," Advances in Optics and Photonics, vol. 2, No. 3, 2010, pp. 370-404. <https://sci-hub.ru/10.1364/aop.2.000370> Downloaded Jun. 20, 2023.

(Continued)

*Primary Examiner* — Jonathan M Hansen
(74) *Attorney, Agent, or Firm* — NORTON ROSE FULBRIGHT US LLP

(57) ABSTRACT

An optical rotation rate sensor. The sensor includes a laser light source for generating weak light pulses, optically connected to a photonic waveguide, optically connected to a first interference coupler that includes a first input and two first outputs, optically connected to a second interference coupler that includes two second inputs and two second outputs, optically connected to at least one first sensor waveguide for showing the Sagnac effect, optically connected to a third interference coupler that includes two third inputs and two third outputs, optically connected to two photodetectors, the photonic waveguide, the first interference coupler, the second interference coupler, the third interference coupler and the sensor waveguide being integrated on a shared substrate.

12 Claims, 4 Drawing Sheets

(56) References Cited

U.S. PATENT DOCUMENTS

2022/0365400 A1* 11/2022 Zeiler ................. G02F 1/212

OTHER PUBLICATIONS

Faucheux et al., "The Ring Laser Gyro," IOP Publishing Ltd., Journal of Optics, vol. 19 No. 3, 1988, pp. 101-115.

Feng et al., "Progress of Waveguide Ring Resonators Used in Micro-Optical Gyroscopes," Photonics, vol. 7, No. 96, 2020, pp. 1-16. <https://www.mdpi.com/2304-6732/7/4/96> Downloaded Jun. 20, 2023.

Kolkiran et al., "Heisenberg Limited SAGNAC Interferometry," Optics Express, vol. 15, No. 11, 2007, pp. 6798-6808. <https://opg.optica.org/directpdfaccess/92c4f6b0-125d-4b8c-94ee0a3b272396a0_134973/oe-15-11-6798.pdf?da=1&id=134973&seq=0&mobile=no> Downloaded Jun. 20, 2023.

Fink et al., "Entanglement-Enhanced Optical Gyroscope," New Journal of Physics, IOP Publishing, vol. 21, No. 5, 2019, pp. 1-7. <https://iopscience.iop.org/article/10.1088/1367-2630/ab1bb2/pdf> Downloaded Jun. 20, 2023.

De Leonardis et al., "On-Chip Group-IV Heisenberg-Limited SAGNAC Interferometric Gyroscope at Room Temperature," Sensors, vol. 20, No. 12, 2020, pp. 1-15. <https://www.mdpi.com/1424-8220/20/12/3476> Downloaded Jun. 20, 2023.

Agne et al., "Hong-Ou-Mandel Interference of Unconventional Temporal Laser Modes," Optics Express, vol. 28, No. 14, 2020, pp. 20943-20953. <https://opg.optica.org/directpdfaccess/a426cafb-c8a0-4632-8f8bdf6678d3876b_433119/oe-28-14-20943.pdf?da=1&id=433119&seq=0&mobile=no> Downloaded Jun. 20, 2023.

Kim et al., "Heterogeneously-Integrated Optical Phase Shifters for Next-Generation Modulators and Switches on a Silicon Photonics Platform: A Review," Micromachines, vol. 12, No. 6, 2021, pp. 1-19. <https://www.mdpi.com/2072-666X/12/6/625> Downloaded Jun. 20, 2023.

* cited by examiner

CHIP-INTEGRATED OPTICAL ROTATION RATE SENSOR

CROSS REFERENCE

The present application claims the benefit under 35 U.S.C. § 119 of German Patent Application No. DE 10 2022 206 454.2 filed on Jun. 27, 2022, which is expressly incorporated herein by reference in its entirety.

BACKGROUND INFORMATION

There are optical gyroscopes that are based on the Sagnac effect. In this case there are fiber-based and ring laser-based commercially available options. Fiber-based gyroscopes are based on light being continuously injected into an optical fiber in two opposite directions. Due to the Sagnac effect, the effectively covered length of both optical paths varies during a rotation of the system. The phase of the light is shifted as a result. After passing through the optical fiber, both optical paths meet again and a superimposition of the light waves takes place. In the process, constructive and destructive interference occurs and the result is a light wave whose intensity varies in proportion to the rotation rate and which is measured. The paper by Caterina Ciminelli, Francesco Dell'Olio, Carlo E. Campanella, and Mario N. Armenise, "Photonic technologies for angular velocity sensing," Adv. Opt. Photon. 2, 370-404 (2010) describes such an optical rotation rate sensor.

In ring laser gyroscopes, light is injected into a ring resonator in two opposite direction. Ring resonators are closed, circular structures in which light is able to circulate. Here, too, the effective path lengths vary during the rotation of the system due to the Sagnac effect and the frequency of the light changes as a result. Since particular frequencies are amplified in a ring resonator and other frequencies are dampened, the intensity varies during a rotation. This may be measured and is proportional to the rotation rate. The paper by M. Faucheux, D. Fayoux and J. J. Roland, "The ring laser gyro," IOP Publishing, vol. 19 no. 3 (1988) also describes such a ring laser gyroscope.

For these fiber-based and ring laser-based gyroscopes, there are commercially only large voluminous options and in research also chip-integrated options. Chip-integrated options require a very high-quality manufacturing in order to achieve a high sensitivity as in the large options. This has as yet not been implemented. The paper by Feng, Z.; He, Y.; Yan, W.; Yang, F.; Han, W.; Li, Z. "Progress of Waveguide Ring Resonators Used in Micro-Optical Gyroscopes," Photonics, 7, 96 (2020) provides detailed observations in this regard.

To achieve a higher sensitivity, there is the possibility of using entangled photons. This is indicated in the paper by Aziz Kolkiran and G. S. Agarwal, "Heisenberg limited Sagnac interferometry," Opt. Express 15, 6798-6808 (2007). For the fiber-based gyroscope, the paper by Matthias Fink, Fabian Steinlechner, Johannes Handsteiner, Jonathan P. Dowling, Thomas Scheidl, Rupert Ursin, "Entanglement-enhanced optical Gyroscope," IOP Publishing, vol. 21 no. 5 (2019) documents first attempts, which utilize this quantum amplification. In this case, two photons entangled with one another are injected into an optical fiber in opposite directions. Due to the Sagnac effect, the effective path length of both photons varies. The photons subsequently interfere at a beam splitter, which has two outputs and two inputs and the Hong-Ou-Mandel interference occurs. In this interference, two indistinguishable photons invariably exit the same output of a beam splitter. The number of incident photons is measured at the outputs of the beam splitter in each case with detectors. If no rotation rate is present at the system, then both photons are measured at only one detector. If a rotation rate is present, however, then there is the likelihood that the photons are measured by only one detector or each detector measures one photon each. This likelihood is a function of the applied rotation rate.

The method using the quantum amplification has been experimentally demonstrated using large optics and covered in theory for chip-integrated options. The latter have the disadvantage, however, that a single photon source and single photon detectors are required. These single photon components either have large dimensions or when chip-integrated are presently reliably usable only at a particular temperature. The latter is described in the paper by De Leonardis, F.; Soref, R.; De Carlo, M.; Passaro, V. M. N. "On-Chip Group-IV Heisenberg-Limited Sagnac Interferometric Gyroscope at Room Temperature," Sensors 20, 3476 (2020).

In the paper by Sascha Agne, Jeongwan Jin, Katanya B. Kuntz, Filippo M. Miatto, Jean-Philippe Bourgoin, and Thomas Jennewein, "Hong-Ou-Mandel interference of unconventional temporal laser modes," Opt. Express 28, 20943-20953 (2020) it has already been experimentally demonstrated that the Hong-Ou-Mandel interference is possible also with weak, pulsed light sources. For this purpose, the light pulses are weakened so that they are close in the single photon regime.

Integrated phase shifters are also described in the related art: Kim, Y.; Han, J.-H.; Ahn, D.; Kim, S. "Heterogeneously-Integrated Optical Phase Shifters for Next-Generation Modulators and Switches on a Silicon Photonics Platform: A Review." Micromachines, 12, 625 (2021). These have already been experimentally demonstrated and are able to actively shift the phase of the light.

SUMMARY

An object of the present invention is to provide a compact, robust and measurement-sensitive rotation rate sensor.

The present invention is based on the use of a weak, pulsed laser source instead of a single photon source for a quantum amplification. An optical chip-integrated gyroscope is implemented by the present invention, which is able to measure a rotation rate. The advantage is that this is possible in a compact sensor system, which is designed to be chip-integrated and which has a high sensitivity. For this purpose, the Hong-Ou-Mandel effect is utilized without the use of a complex single photon source. A weak, pulsed laser source is used instead. This has the decisive advantage that it may be implemented in a compact manner and may be operated over a broad temperature range. In one further specific embodiment, it is possible, instead of a laser source, to also use a source for other quantum states such as, for example, squeezed states, which may be coupled externally into the chip.

The gyroscope according to an example embodiment of the present invention includes chip-integrated optics such as planar waveguides, multi-mode interferometers, which are made up of wide waveguide structures having a certain length for transferring the input light into particular modes, grating couplers and ring resonators. The laser source may be chip-integrated, or the laser beam may be generated outside the chip and coupled via a grating coupler or laterally into the latter.

Active phase shifters are advantageously used in order to actively maintain the sensitivity of the sensor at a maximum.

The photodetectors are advantageously designed as photodiodes, which are particularly advantageously integrated on the shared substrate.

DETAILED DESCRIPTION OF EXAMPLE EMBODIMENTS

Figure 1A:
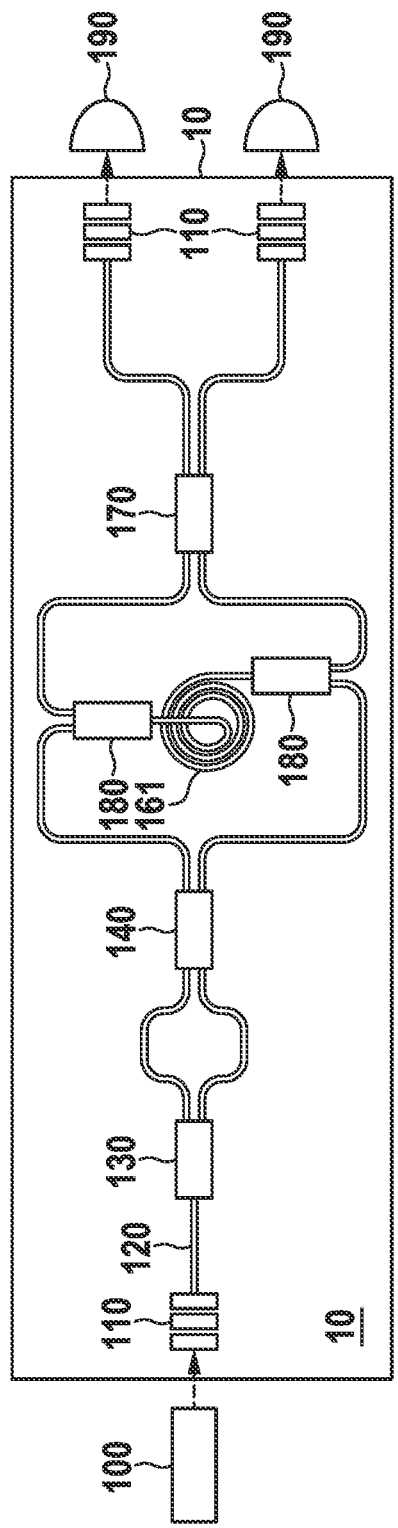
FIG. 1A schematically shows the design of an optical chip-integrated rotation rate sensor according to the present invention in a first exemplary embodiment including a sensor waveguide.

A weak laser source generates pulsed light at a particular frequency. This laser source may be manufactured to be chip-integrated or an external source is used, whose light is coupled via a grating coupler, or via lateral chip-coupling into a photonic waveguide. A grating coupler is made up of periodic structures at which the light is refracted and is directed in a particular direction.

The photonic waveguide is designed in integrated optics. This usually involves a planar waveguide in the form of a dielectric layer, which is embedded between two dielectrics having a lower refractive index. Such a layer may be created in quartz glass, lithium niobate, semiconductors or in other substrates by diffusion using various doping agents, via which the refractive index is locally increased. Polymer films on a substrate may also be used as waveguides. The planar waveguide has a channel-like design for guiding the light in a two-dimensional manner. Such waveguides may, for example, be manufactured using lithographic methods.

The light pulses coupled in the chip are split equally into two light paths via a first interference coupler such as, for example, a first multi-mode interferometer that includes a first input and two first outputs. A multi-mode interferometer is a chip-integrated beam splitter, which is able to split light to particular proportions in particular directions. Besides multi-mode interferometers or multi-mode interference couplers (MMI coupler), it is possible, for example, to also use waveguide couplers.

The light pulses, of the different optical paths, are entangled with one another at a second interference coupler such as, for example, at a second multi-mode interferometer that includes two inputs and two second outputs.

In one exemplary embodiment, the light pulses are subsequently injected into a long waveguide in opposite directions. In another specific embodiment, the light pulses are subsequently injected into two separate long waveguides. These waveguides serve as a sensor area, in which the Sagnac effect occurs and are referred to below as sensor waveguides.

The first specific embodiment in this case has lower losses and the second exemplary embodiment is more stable against external influences. If the chip is rotated, one optical path is then effectively longer and the other is effectively shorter.

A phase shifter may be optionally situated at one or at both optical paths. This phase shifter may be positioned before or after the sensor area and may actively change the phase of the light.

The different optical paths are subsequently merged at a third multi-mode interferometer, which has two third inputs and two third outputs. The Hong-Ou-Mandel interference then occurs at this multi-mode interferometer. If two light pulses simultaneously strike the third multi-mode interferometer, then they exit the latter at the same output. Which output this is, is random in this case. If, however, the light pulses strike with a temporal offset, then there is only a probability of <1 that the pulses use the same output. This probability decreases if the temporal offset increases. This temporal offset in turn becomes greater with a greater applied rotation rate of the chip. The Hong-Ou-Mandel interferences changes most drastically during a particular phase shift between the two light pulses. With the aid of the phase shifter, it is now possible to actively operate the sensor in this range and thus to establish a closed control loop.

In one further specific embodiment, two ring resonators are used as the sensor area. Each ring in this case represents a different path and the Hong-Ou-Mandel interference occurs between the two rings. The rings have filter characteristics, which render the system even more sensitive. The two outputs of the multi-mode interferometer each lead to photodiodes, which measure the light signal. The photodiodes in this case may be designed to be chip-integrated, or discrete. In the second case, the light is decoupled via grating couplers or laterally and is guided to photodiodes. Based on the variously measured intensities at the photodiodes, it is possible to calculate the temporal offset of the light pulses, and thus the rotation rate, and a quantum amplification is achieved with the aid of the Hong-Ou-Mandel interference. The integrated optical components each exhibit particular losses, which may be actively utilized in order to weaken the light pulses. This is an important property for bringing the laser pulses into a single photon regime, and making the Hong-Ou-Mandel interference possible as a result.

FIG. 1A schematically shows the design of an optical chip-integrated rotation rate sensor in a first exemplary embodiment including a sensor waveguide. A laser light source 100 is optically connected to a photonic waveguide 120 with the aid of a grating coupler 110. A first interference coupler 130 includes one first input and two first outputs. The waveguide is connected to the first input of a first interference coupler 130. The first interference coupler also includes two first outputs, which are connected to two second inputs of a second interference coupler 140. The second interference coupler includes two outputs. Each of the two second outputs is connected to a fourth input of a fourth interference coupler 180. In addition to a fourth input, the two fourth interference couplers each include two fourth outputs. A fourth output of each fourth interference coupler is connected to one end each of a sensor waveguide 161 arranged in a spiral pattern, so that light is able to be coupled into the sensor waveguide at both ends. The other fourth output of the fourth interference coupler is connected in each case with one of two third inputs of a third interference coupler 170. The third interference coupler also includes two third outputs, which are optically connected in each case to a grating coupler 110. The light is decoupled at the output with each of these two grating couplers and is able in each case to be received by a photodetector 190. The three grating couplers 110, photonic wave guide 120, first interference coupler 130, second interference coupler 140, third interference coupler 170 and the two fourth interference couplers 180 and sensor waveguide 161 are integrated on a shared substrate 10. The interference couplers are designed as so-called multi-mode interferometers or multi-mode interference couplers (MMI couplers) or also as waveguide couplers. When the optical rotation rate sensor is rotated in the plane of the substrate, the Sagnac effect takes place in the sensor waveguide 161, and the rotation rate is able to be determined from the light pulses received at the photodetectors.

Figure 1B:
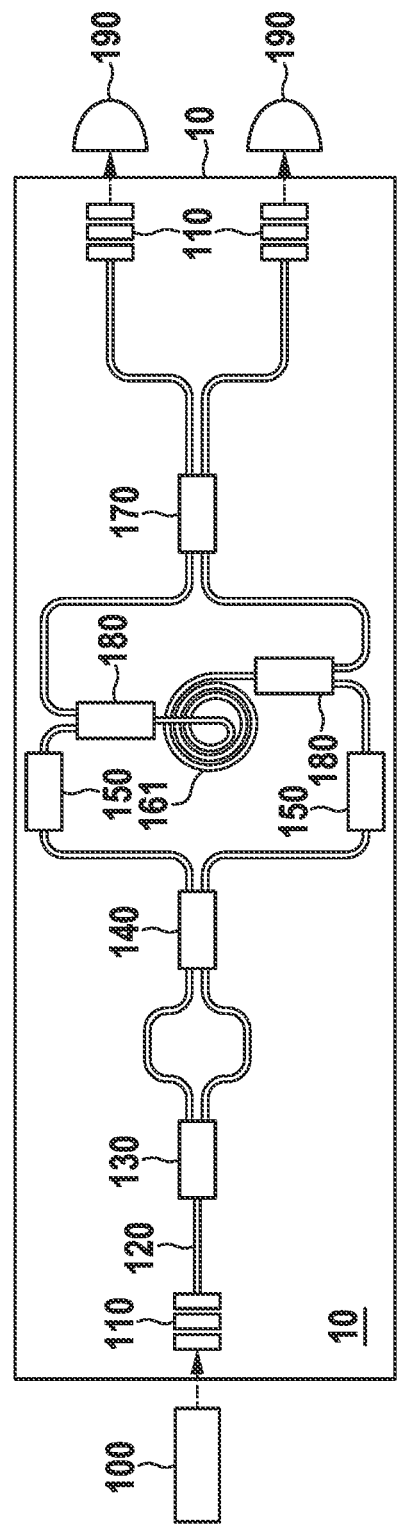
FIG. 1B schematically shows the design of an optical chip-integrated rotation rate sensor according to the present invention in a second exemplary embodiment including a sensor waveguide and two phase shifters.

FIG. 1B schematically shows the design of an optical chip-integrated rotation rate sensor according to the present embodiment in a second exemplary embodiment including a sensor waveguide and two phase shifters.

Except for second interference coupler 140, the design corresponds to the exemplary embodiment shown in FIG. 1A. In addition to the exemplary embodiment shown in FIG. 1A, the rotation rate sensor includes one phase shifter 150 each between the one second output of second interference coupler 140 and first sensor waveguide 161, as well as between the other second output of second interference coupler 140 and first sensor waveguide 161.

Figure 2A:
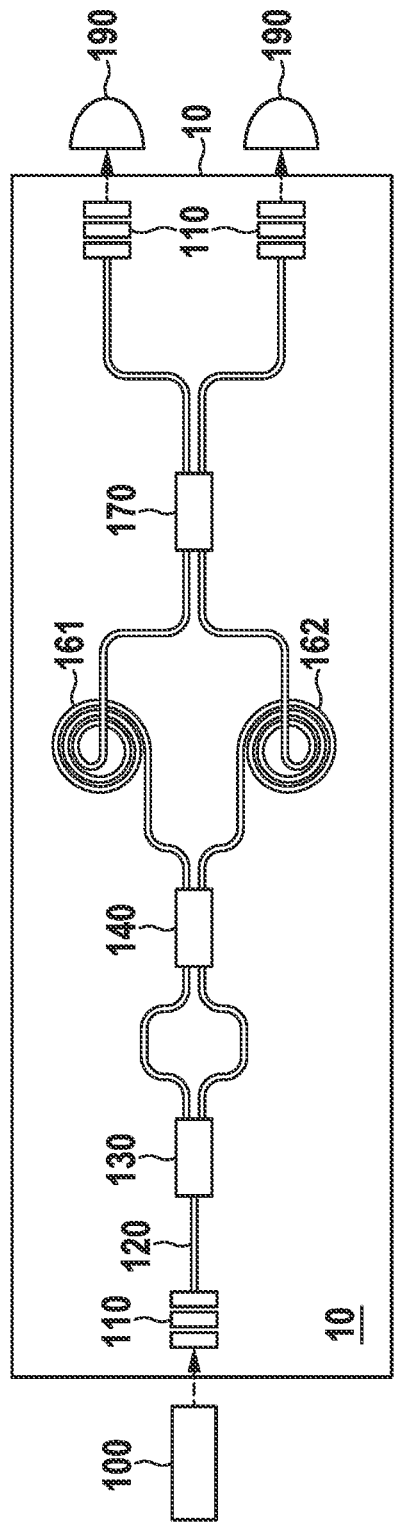
FIG. 2A schematically shows the design of an optical chip-integrated rotation rate sensor according to the present invention in a third exemplary embodiment including two sensor waveguides arranged separately in a spiral pattern.

FIG. 2A schematically shows the design of an optical chip-integrated rotation rate sensor according to the present invention in a third exemplary embodiment including two sensor waveguides arranged separately in a spiral pattern. Except for second interferometers 140, the design corresponds to the exemplary embodiment shown in FIG. 1A. In contrast thereto, however, a second output of second interference coupler 140 is connected to a first sensor waveguide 161 and the other second output to a second sensor waveguide 162. The two sensor waveguides are arranged separately next to one another in a spiral pattern and are connected at their other end in each case to a third input of third interference coupler 170. The third interference coupler in turn includes two third outputs, which are optically connected in each case to a grating coupler 110 and the further design corresponds to the exemplary embodiment shown in FIG. 1A.

Figure 2B:
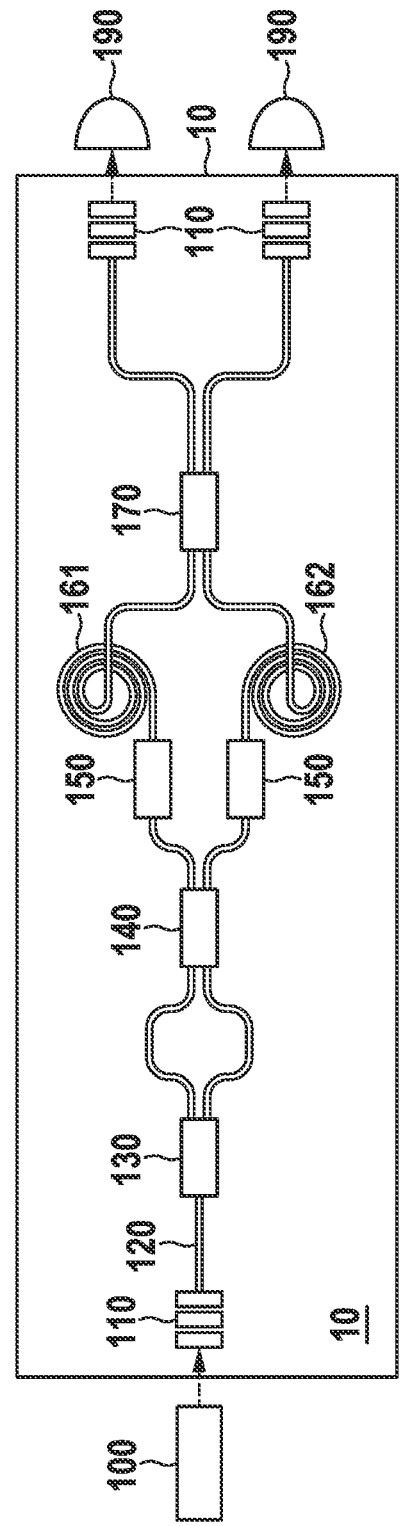
FIG. 2B schematically shows the design of an optical chip-integrated rotation rate sensor according to the present invention in a fourth exemplary embodiment including two sensor waveguides arranged separately in a spiral pattern and two phase shifters.

FIG. 2B schematically shows the design of an optical chip-integrated rotation rate sensor according to the present invention in a fourth exemplary embodiment including two sensor waveguides arranged separately in a spiral pattern and two phase shifters.

In addition to the exemplary embodiment shown in FIG. 2A, the rotation rate sensor includes one phase shifter 150 each between the one second output of second interference coupler 140 and first sensor waveguide 161, as well as between the other second output of second interference coupler 140 and second sensor waveguide 162. With the aid of these phase shifters, it is possible to implement a closed control loop by actively shifting the phase of one or of both optical paths in order to maintain the system in the most sensitive range. The adjustment of the phase shifters may then be utilized as a measure of the rotation rate.

Figure 3A:
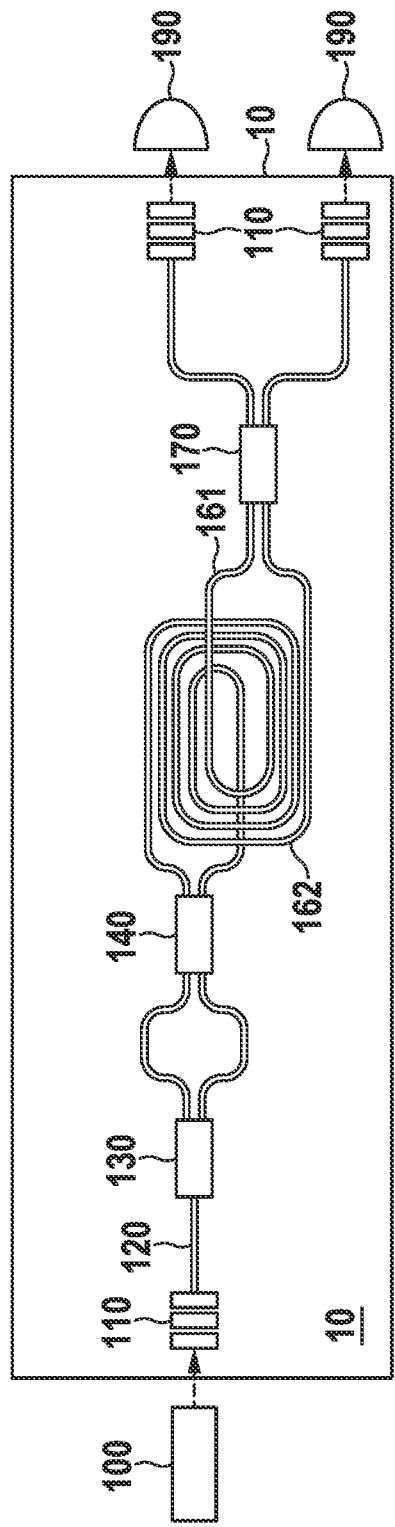
FIG. 3A schematically shows the design of an optical chip-integrated rotation rate sensor according to the present invention in a fifth exemplary embodiment including two sensor waveguides arranged entangled in a spiral pattern.

FIG. 3A schematically shows the design of an optical chip-integrated rotation rate sensor according to the present invention in a fifth exemplary embodiment including two sensor waveguides arranged entangled in a spiral pattern.

The design corresponds essentially to the exemplary embodiment shown in FIG. 2B, with the difference that first sensor waveguide 161 and second sensor waveguide 162 are arranged entangled in one another. This saves space and reduces error influences, for example, as a result of thermal gradients.

Figure 3B:
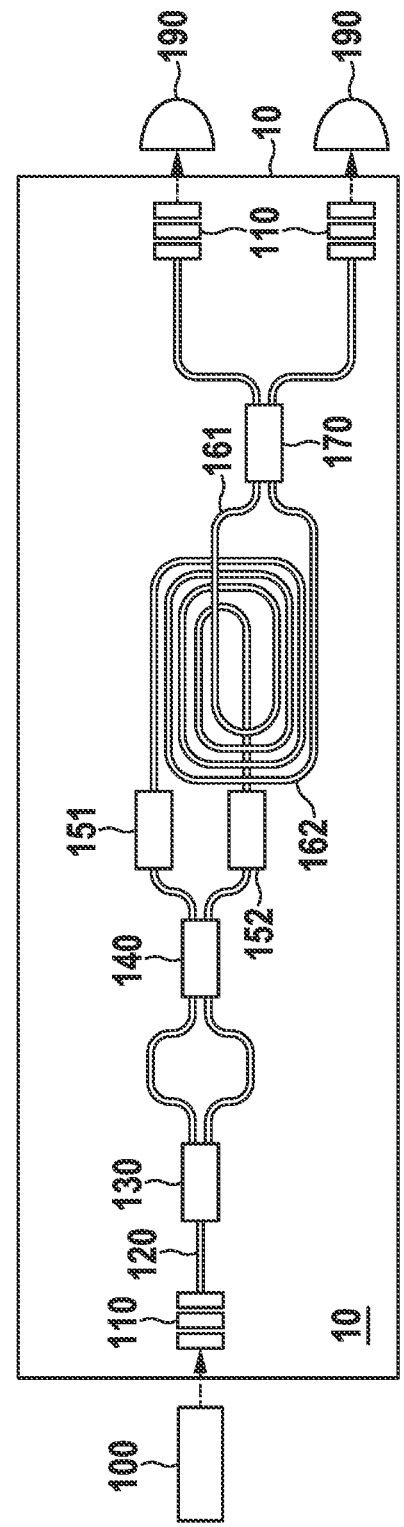
FIG. 3B schematically shows the design of an optical chip-integrated rotation rate sensor according to the present invention in a sixth exemplary embodiment including two sensor waveguides arranged entangled in a spiral pattern and two phase shifters.

FIG. 3B schematically shows the design of an optical chip-integrated rotation rate sensor according to the present invention in a sixth exemplary embodiment including two sensor waveguides arranged entangled in a spiral pattern and two phase shifters.

In addition to the exemplary embodiment shown in FIG. 3A, the rotation rate sensor includes one phase shifter 150 each between the one second output of second interference coupler 140 and first sensor waveguide 161, as well as between the other second output of the second interference coupler 140 and second sensor waveguide 162.

Figure 4A:
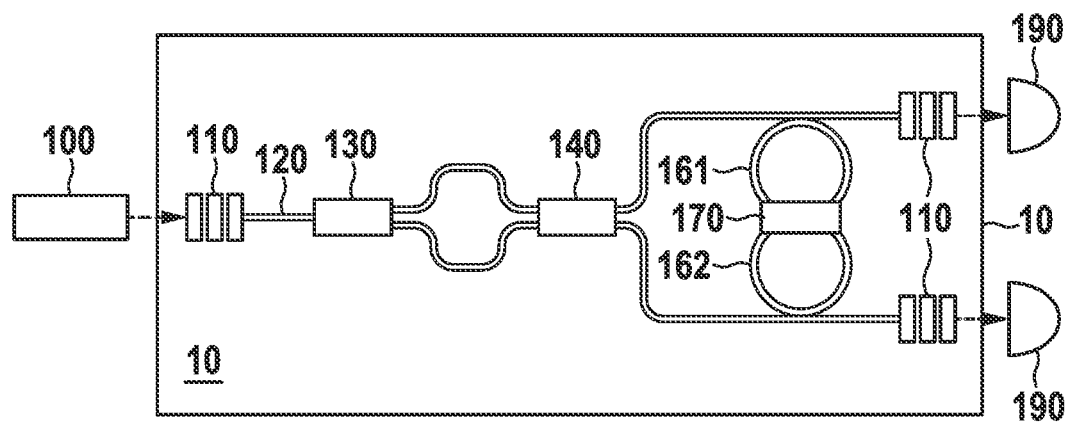
FIG. 4A schematically shows the design of an optical chip-integrated rotation rate sensor according to the present invention in a seventh exemplary embodiment including two ring resonators.

FIG. 4A schematically shows the design of an optical chip-integrated rotation rate sensor according to the present invention in a seventh exemplary embodiment including two ring resonators. The design corresponds essentially to the exemplary embodiment shown in FIG. 2B, with the difference that first sensor waveguide 161 and second sensor waveguide 162 are designed as ring resonators and third interference coupler 170 is situated between the two ring resonators.

Figure 4B:
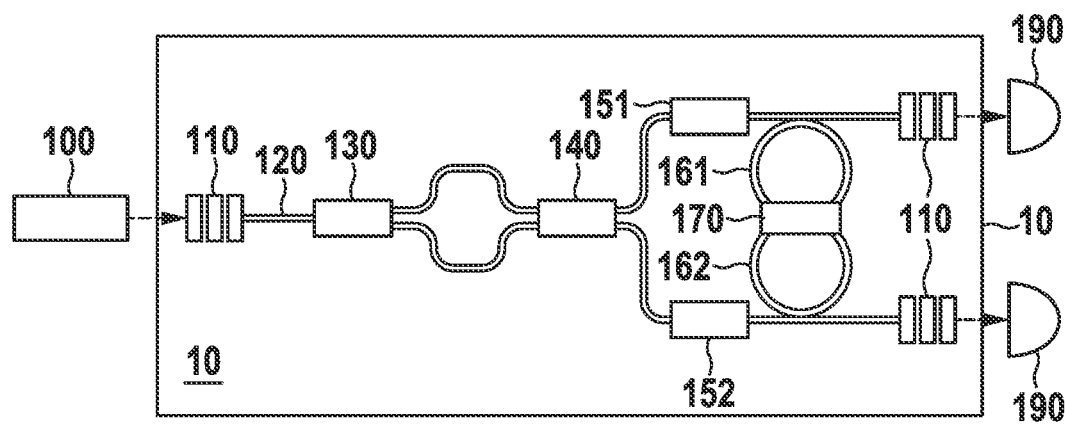
FIG. 4B schematically shows the design of an optical chip-integrated rotation rate sensor according to the present invention in an eighth exemplary embodiment including two ring resonators and two phase shifters.

FIG. 4B schematically shows the design of an optical chip-integrated rotation rate sensor according to the present invention in an eighth exemplary embodiment including two ring resonators and two phase shifters.

In addition to the exemplary embodiment shown in FIG. 4A, the rotation rate sensor includes one phase shifter 150 each between the one second output of second interference coupler 140 and first sensor waveguide 161, as well as between the other second output of the second interference coupler 140 and second waveguide 162.

LIST OF REFERENCE NUMERALS 10 substrate
100 laser source
110 grating coupler
120 photonic waveguide
130 first interference coupler
140 second interference coupler
150 phase shifter
161 first sensor waveguide
162 second sensor waveguide
170 third interference coupler
180 fourth interference coupler
190 photodetector

What is claimed is:

1. An optical rotation rate sensor, comprising:
a laser light source configured to generate weak light pulses, optically connected to a photonic waveguide, optically connected to a first interference coupler that includes a first input and two first outputs, optically connected to a second interference coupler that includes two second inputs and two second outputs, optically connected to at least one first sensor waveguide for showing the Sagnac effect, optically connected to a third interference coupler that includes two third inputs and two third outputs, optically connected to two photodetectors;
wherein the photonic waveguide, the first interference coupler, the second interference coupler, the third interference coupler and the sensor waveguide are integrated on a shared substrate.

2. The optical rotation rate sensor as recited in claim 1, wherein:
the second interference coupler that includes two second inputs and two second outputs is initially optically connected to two fourth interference couplers each including one fourth input and two fourth outputs, one of the fourth outputs being optically connected to an end of the first sensor waveguide for showing the Sagnac effect, the other fourth output being optically connected to one of the two photodetectors;
wherein the two fourth interference couplers are integrated on the shared substrate.

3. The optical rotation rate sensor as recited in claim 1, wherein the second interference coupler that includes two second inputs and two second outputs is optically connected to the first sensor waveguide and to a second sensor waveguide for showing the Sagnac effect which are optically connected to the third interference coupler that includes the two third inputs and two third outputs, the second sensor waveguide being integrated on the shared substrate.

4. The optical rotation rate sensor as recited in claim 2, wherein: i) a first phase shifter is optically connected to the first sensor waveguide and/or ii) a second phase shifter is optically connected to the second sensor waveguide, wherein the first phase shifter and/or the second phase shifter is integrated on the shared substrate.

5. The optical rotation rate sensor as recited in claim 1, wherein the laser light source is optically connected to the first input via grating coupler or lateral chip coupling.

6. The optical rotation rate sensor as recited in claim 5, wherein the laser light source is external to the shared substrate.

7. The optical rotation rate sensor as recited in claim 1, wherein the laser light source is integrated on the shared substrate and is optically directly connected to the photonic waveguide.

8. The optical rotation rate sensor as recited in claim 1, wherein the photodetector is an externally constructed photodiode.

9. The optical rotation rate sensor as recited in claim 1, wherein the photodetector is a photodiode and is integrated on the shared substrate.

10. The optical rotation rate sensor as recited in claim 3, wherein the first and second sensor waveguides are arranged separately in a spiral pattern are integrated on the shared substrate.

11. The optical rotation rate sensor as recited in claim 3, wherein the first and second sensor waveguides are arranged entangled in a spiral pattern are integrated on the shared substrate.

12. The optical rotation rate sensor as recited in claim 3, wherein two ring resonators are integrated as the first and second sensor waveguides on the shared substrate.

* * * * *